United States Patent [19]

Raffauf

[11] 4,252,599
[45] Feb. 24, 1981

[54] BONDING OF FRICTION LINING TO SHOE PLATFORMS

[75] Inventor: Alois Raffauf, Koblenz-Kesselheim, Fed. Rep. of Germany

[73] Assignee: Girling Limited, Birmingham, England

[21] Appl. No.: 571,549

[22] Filed: Apr. 25, 1975

[30] Foreign Application Priority Data

May 9, 1974 [GB] United Kingdom ............... 20635/74

[51] Int. Cl.³ .......................... B23Q 3/00; B30B 15/00
[52] U.S. Cl. ............................... 156/557; 100/93 PB; 156/580; 269/900
[58] Field of Search ............... 156/228, 288, 538, 557, 156/580, 581; 269/321 B, 130; 100/93 PB; 188/250 B

[56] References Cited

U.S. PATENT DOCUMENTS

| 2,523,507 | 9/1950 | Langford et al. ..................... 156/581 |
| 2,541,672 | 2/1951 | Shields et al. ........................ 156/580 |
| 2,616,479 | 11/1952 | Barrett .............................. 269/321 B |
| 2,726,974 | 12/1955 | Lupton et al. .................... 269/321 B |
| 3,169,017 | 2/1965 | Tilden, Sr. et al. ............... 269/321 B |
| 3,603,582 | 9/1971 | Nelson ............................... 269/321 B |
| 3,638,560 | 2/1972 | Morgan, Sr. et al. ........... 269/321 B |

Primary Examiner—Michael G. Wityshyn
Attorney, Agent, or Firm—Scrivener, Clarke, Scrivener and Johnson

[57] ABSTRACT

A fixture for use in bonding friction linings to platforms of brake shoes comprises an arcuate support against which the lining and the platform are compressed together by a spring assembly acting on the web of the shoe. The fixture preferably accommodates two opposed shoes simultaneously, with the shoes being urged apart by a single spring assembly to urge the linings into engagement with a single loop of this flexible metal band constituting the support.

5 Claims, 6 Drawing Figures

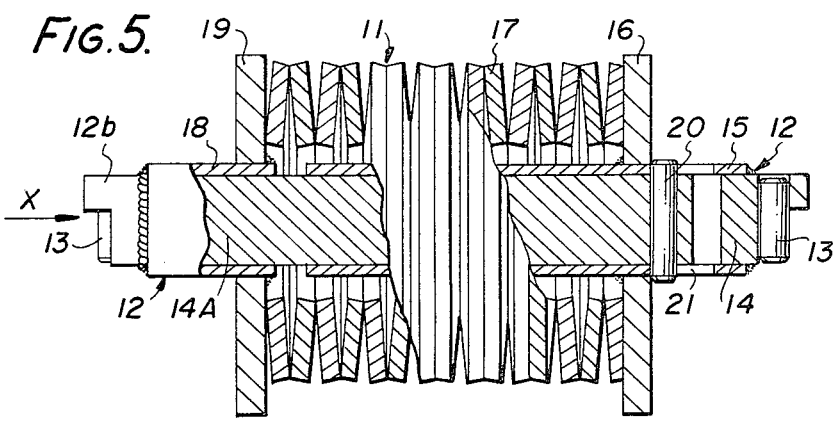
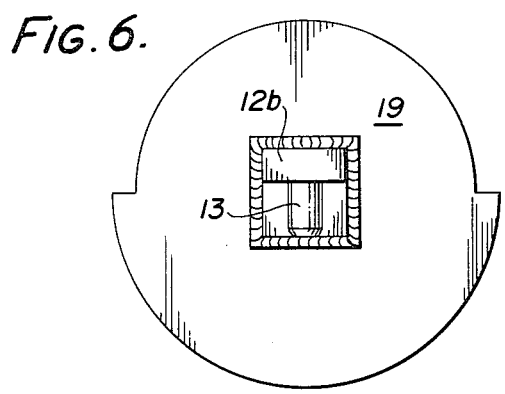
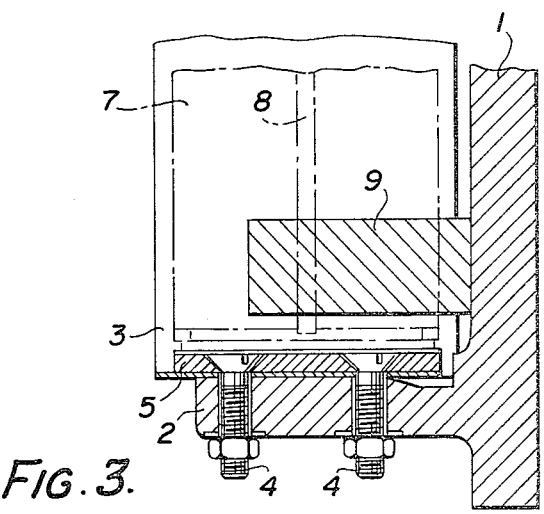

BONDING OF FRICTION LINING TO SHOE PLATFORMS

This invention relates to fixtures for use in bonding friction linings to platforms of brake shoes.

Brake shoes normally comprise an arcuate web welded to the inner concave surface of the platform, and a friction lining secured to the opposed, convex surface by a heat curable adhesive. In use, brake drag forces are transmitted from the lining through the adhesive bond to the platform and the bond should therefore be good over the whole area of contact of the lining with the platform.

In accordance with one feature of the present invention, there is provided a fixture for use in bonding friction linings to platforms of brake shoes, comprising an arcuate support, and resilient means which in use act on the web of the shoe to compress the lining and platform together against the support.

Preferably the fixture can accommodate two opposed shoes located within the support and the resilient means comprises a single spring assembly acting against the opposed shoe webs. The support is preferably a thin flexible metal band.

Locating means are preferably provided to locate the lining of each shoe longitudinally relative to the platform and for positioning the platform and lining of the shoe laterally relative to each other, so that the lining is laterally spaced from the edges of the platform.

The spring assembly and the or each shoe are preferably so aligned that the spring force acts on the web of the or each shoe at a position midway between the ends of the lining.

In accordance with another feature of the invention, there is provided a method of bonding a friction lining to a platform of a brake shoe, comprising the steps of locating the lining on the platform with an adhesive therebetween, and resiliently urging the platform and lining together against a support adjacent the lining.

A fixture for use in bonding friction linings to the platform of arcuate brake shoe will now be described, by way of example, with reference to the accompanying drawings, in which:

FIG. 3 is an enlarged detail section taken along the line III—III of FIG. 1,

FIG. 5 is an enlarged part-sectional view of a spring assembly shown in FIG. 1 but with a modification, and FIG. 6 is an end view of the spring assembly of FIG. 5 taken in the direction of arrow X.

Figure 1:
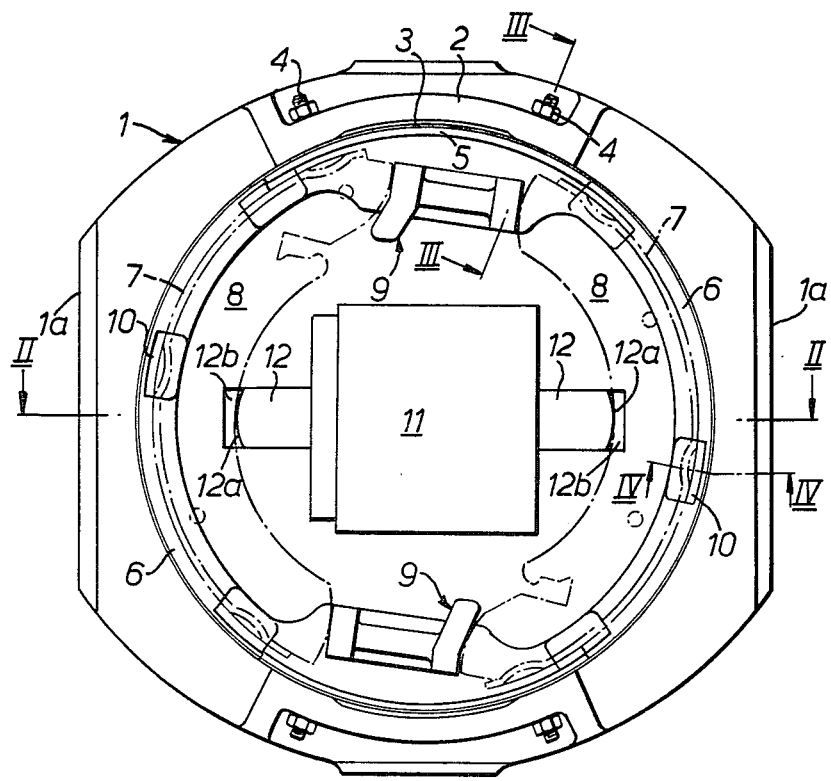
FIG. 1 is a plan view of the fixture.
Figure 2:
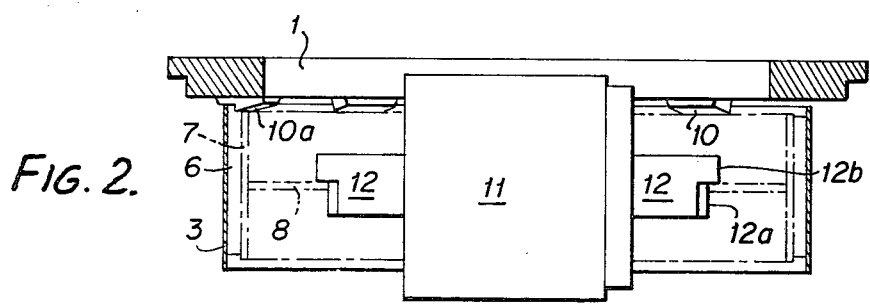
FIG. 2 is a section taken along the line II—II of FIG. 1.

The fixture comprises a base 1 having two diametrically opposed upturned flanges 2. An endless thin metal band 3 is secured to the flanges 2 by bolts 4 (FIG. 3) which also fix a lining locating member 5 to each flange for locating shoe linings to be bonded as will be hereinafter described.

Figure 4:
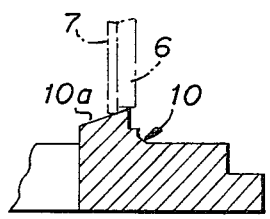
FIG. 4 is an enlarged detail section taken along the line IV—IV of FIG. 1.

In the illustrated fixture two brake shoe linings 6 can be bonded to respective platforms 7 and the shoes are located in the fixture as indicated by chain lines. The web 8 of each shoe engages at its ends abutment assemblies 9 mounted on the base, and one edge of the platform and lining of each shoe rests on wedge supports 10 (FIG. 4) integral with the base. The lining 6 of each shoe is narrower than its associated platform and the wedge surface 10a ensures that the lining is held laterally from the edge of the platform. A loading fixture or cover (not shown) has similar wedge supports and engages the other, opposite edges of the platform and lining. The opposite ends of each lining 6 engage the locating members 5 so that each lining is located longitudinally on its platform.

Located between the opposed shoes is a spring assembly 11 having two opposed abutments 12 which engage the respective shoe webs 8 and which are spring biased apart to urge the linings 6 into engagement with the retaining band 3. Preferably the band is not circular in its tensioned state and the inner surfaces of flanges 2 against which the band is secured are located radially inwardly of the radially outer surfaces of the linings so that in the tensioned state a greater bonding pressure is applied to the ends of the linings than to the intermediate parts.

In the fixture illustrated in FIG. 1, each abutment 12 of the spring assembly 11 has at its end an upper arcuate end face 12a which engages the web and a lower extension 12b beneath the web. The spring assembly of FIG. 5 has modified abutments in each of which the arcuate end face is provided by a roller 13 welded to the end of an abutment member. In the left hand abutment the abutment member is a square-section core 14 welded to a sleeve 15 which is in turn welded to an annular plate 16 forming one seat for a stack of Belleville washers 17. In the right hand abutment the roller 13 is welded to another square-section core 14A secured to a sleeve 18 which is welded to an annular plate forming the other seat for the Belleville washers stack. The core 14A extends into the left hand sleeve 15 and is located for limited axial movement relative to sleeve 15 by a pin 20 slidable in slots 21 formed in the sleeve 15. The sleeves 15 and 18 are axially spaced apart to permit compression of the spring assembly. In the illustrated fixture, the spring assembly 11 is not connected to the housing 1, but it may be movably mounted on the housing if so desired.

In use of the fixture, the shoes are located by the abutment assemblies 9 and the linings located relative to the platforms by the wedge supports 10 and the locating members 5 after heat curable adhesive has been applied to the co-operating faces of the platform and lining 6 of each shoe. The spring assembly 11 acts on each web 8 at a point midway between the ends of the lining 6 and forces the shoes apart so that the linings 6 are held against the retaining band 3 to apply a bonding pressure. The fixture is placed in an oven and the adhesive cured. To release the shoes, the fixture is placed on a table supporting a pair of scissor arms which are operable to engage the plates 16 and 19 of the spring assembly 11 to compress the spring and simultaneously push the spring assembly upwardly. Thus the spring force is released and the shoes are moved upwardly because of the engagement of the projections 12b with the underside of the web. The shoes can then be gripped by an operator and removed and fresh shoes and linings inserted for a successive bonding operation. The base 1 has flats 1a to positively locate the fixture on the table and ensure alignment of the scissor arms with the plates 16, 19.

The scissor arms are preferably externally of the fixture, but they may form part of the fixture. Alternatively some other means of releasing the spring force from the webs may be provided.

The above-described fixture has several advantages. Two lined shoes can be fabricated in a single fixture, the fixture is relatively light and easy to handle and quick and cheap to heat up, so permitting a larger through-put than with known fixture and at a reduced energy consumption; the spring assembly need be only slightly compressed to release the spring force from the brake shoes so that a relatively large strength spring may be used to give high bonding pressure; the abutment assemblies 9 and the lining locating members 5 are easily removable and can be replaced by parts of different sizes to permit shoes and linings of different configurations to be bonded; and the wedge supports ensure that each lining is laterally inset from the edges of its platform and properly located on the platform.

Many modifications of the above-described fixture will be possible. For example, the fixture may accept only one brake shoe, the spring assembly acting between the web of the shoe and a fixed seat. The retaining band 3 may be replaced by a rigid member against which the linings are pressed. However, this would result in a heavier and larger fixture requiring more oven space and the pressure on the linings may not be uniform. The wedge supports 10 could be replaced by stepped supports each having two steps supporting respectively the platform and the lining. The lining step would have to be thinner than the lining to ensure that the lining always engaged the platform. The spring assembly 11 could act on a projection extending from the web and spaced from its free edge, instead of directly on the free edge as in the above-described fixture.

What we claim is:

1. A fixture for use in bonding a friction lining to a radially outer surface of a platform brake shoe having a web fast with the radially inner surface of said platform, said fixture comprising a base, means for locating said platform and lining on said base, an arcuate support adapted to engage the radially outer surface of said friction lining, and resilient means arranged to act on said web and providing the sole clamping force for compressing said friction lining and platform against said support, said resilient means having at least one projection which fits only between said shoe web and said base, said resilient means being movable away from said base, laterally of said platform, to engage said projection with said web and pull said shoe away from said base while enabling said shoe to be separately moved clear of said projection while said shoe is partially within said support.

2. A fixture according to claim 1, wherein said resilient means is arranged to act on said web at a position midway between the ends of said lining.

3. A fixture according to claim 1, wherein said locating means is arranged to accommodate two opposed shoes within said arcuate support, said resilient means comprising a single spring assembly acting against said opposed webs and including at least two said projections which fit respectively only between said webs and said base.

4. A fixture according to claim 3, wherein said support is a thin flexible metal band in the form of an endless loop which is tensioned when the friction linings of said opposed shoes are urged against it.

5. A fixture according to claim 4, wherein portions of said band extend between said linings of said opposed shoes, said portions, in the tensioned state of said band, being located radially inwardly of the radially outer surfaces of said linings, whereby the greatest pressure is applied to the ends of the linings.

* * * * *